Dec. 30, 1930.  L. F. CARTER ET AL  1,787,066
SHIP'S TELEGRAPH AND RECORDER SYSTEM
Filed Sept. 3, 1925    3 Sheets-Sheet 1
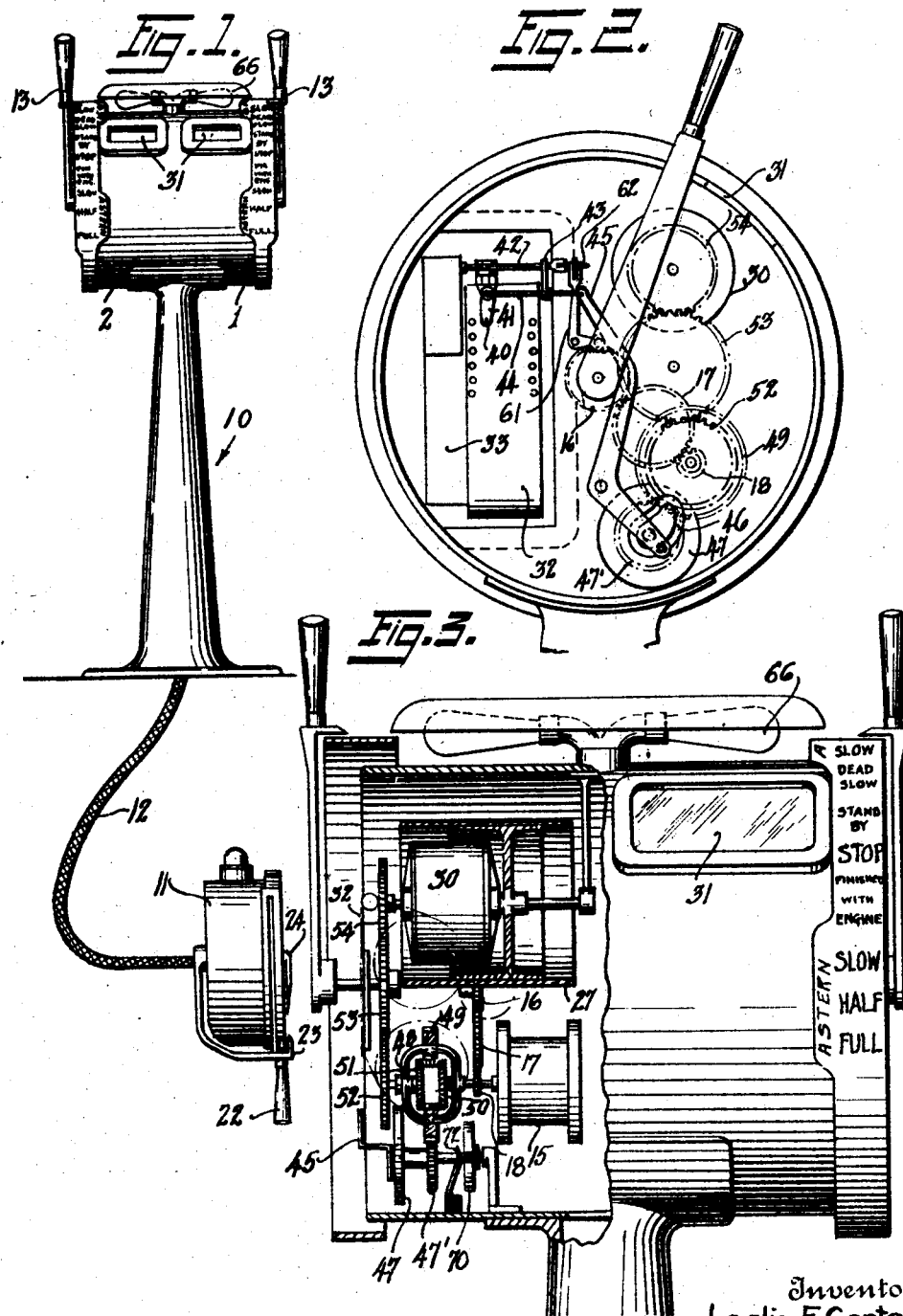
Inventors
Leslie F. Carter:
Frederick S. Hodgman:
By Attorney
Herbert H. Thompson Dec. 30, 1930.  L. F. CARTER ET AL  1,787,066
SHIP'S TELEGRAPH AND RECORDER SYSTEM
Filed Sept. 3, 1925  3 Sheets-Sheet 2
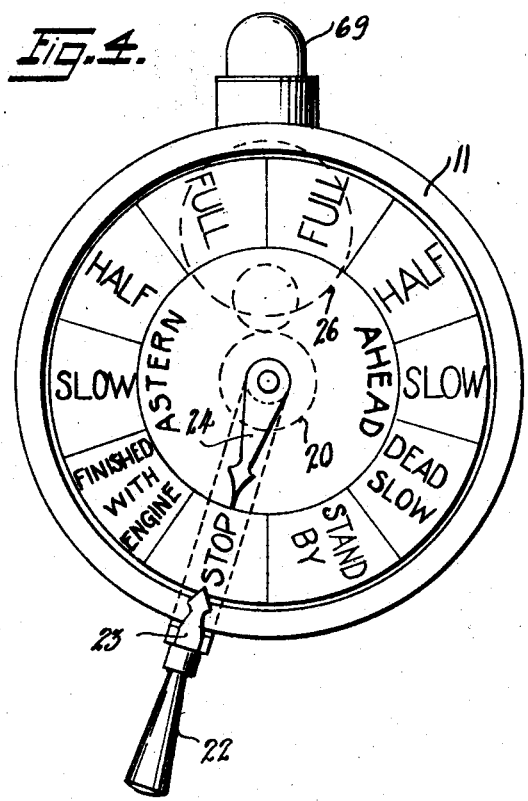
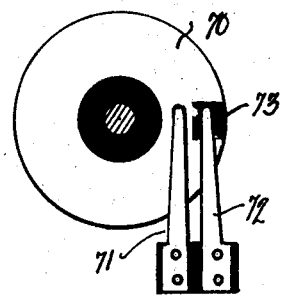
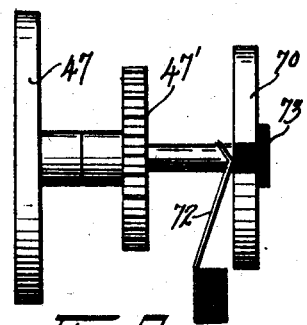
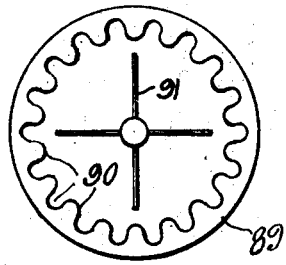
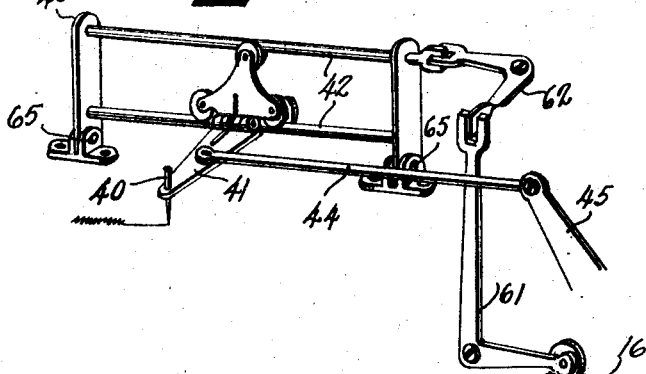
Inventor
Leslie F. Carter:
Frederick S. Hodgman:
By  Attorney
Herbert H. Thompson Dec. 30, 1930.   L. F. CARTER ET AL   1,787,066
SHIP'S TELEGRAPH AND RECORDER SYSTEM
Filed Sept. 3, 1925   3 Sheets-Sheet 3
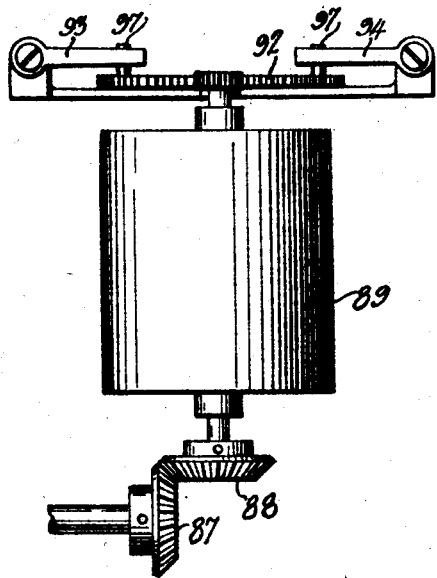
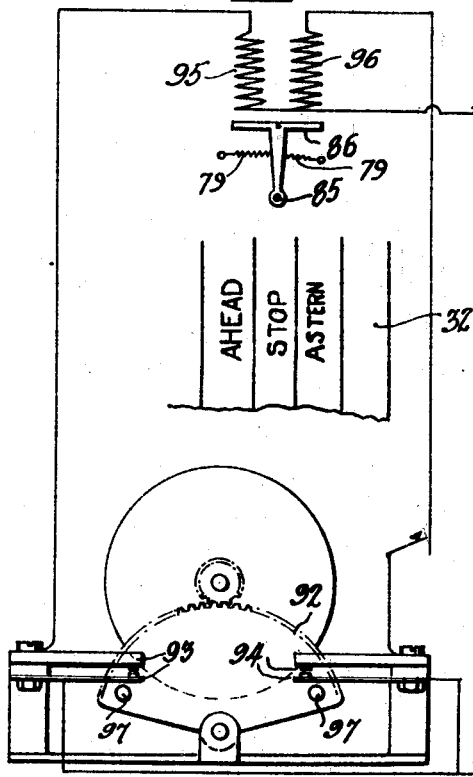
Inventor
Leslie F. Carter:
Frederick S. Hodgman:
By Attorney
Herbert H. Thompson Patented Dec. 30, 1930

1,787,066

UNITED STATES PATENT OFFICE

LESLIE F. CARTER, OF LEONIA, AND FREDERICK S. HODGMAN, OF GLEN ROCK, NEW JERSEY, ASSIGNORS, BY MESNE ASSIGNMENTS, TO SPERRY GYROSCOPE COMPANY, INC., OF BROOKLYN, NEW YORK, A CORPORATION OF NEW YORK

SHIP'S TELEGRAPH AND RECORDER SYSTEM

Application filed September 3, 1925. Serial No. 54,188.

This invention relates to ship's telegraphs and recorders therefor, and has for its object to provide a simple efficient telegraph system between a ship's bridge and the engine room, and at the same time provide a permanent record of all orders sent and responses made thereto and the time when such actions took place. It is a further object of our invention to provide a novel recording mechanism wherein a single record is utilized for indicating both sets of signals, that is, the orders sent and the responses made thereto. For this purpose we utilize a single indicator with means for integrating the said two indications to enable said single indicator to record both sets of signals.

It is a further object of our invention to provide in a recording system, such as outlined above, wherein a single indicator indicates both orders sent and responses made to said orders, means whereby the record will nevertheless distinguish between the said orders and the said responses.

A further object of our invention is to provide suitable signalling mechanism for indicating visibly and audibly any lack of synchronism between the instruments on the bridge and in the engine room.

It is a further object of our invention to provide a record which will not only indicate the orders transmitted from the bridge and the responses made thereto in the engine room, but will also indicate the actual performance of the engines.

Still further objects of this invention will become apparent in the following detailed description thereof.

In the accompanying drawings

Fig. 1 is an assembly view of our telegraph and recording mechanism enclosed in suitable casings.

Fig. 2 is a front elevation, sectioned vertically, of that portion of our telegraph and recording instrument located on the bridge.

Fig. 3 is a side view of the device shown in Fig. 2, partly sectioned vertically, and with parts broken away.

Fig. 4 is a front elevation of the indicating mechanism located in the engine room.

Fig. 5 is a front elevation of a circuit-closing device of the Fig. 3 structure.

Fig. 6 is an end elevation of the circuit-closing device of Fig. 5.

Fig. 7 is an enlarged detail of the recording mechanism.

Fig. 8 is a horizontal section of a portion of the device shown in Fig. 9.

Fig. 9 is a front elevation of a device controlled by the direction of operation of the propeller shaft.

Fig. 10 is an assembly view, partly diagrammatic, illustrating a mechanism for indicating upon the record chart the actual performance of the ship's engines.

Referring to Fig. 1 of the drawings, there is shown an assembled view of our invention which comprises generally the bridge instrument 10 and the engine room instrument 11 suitably interconnected by electric cables 12.

Referring to Figs. 2 and 3, there is disclosed in detail the mechanism contained within the bridge instrument. Said instrument may comprise a casing enclosing substantially all of the operating mechanism and a handle 13 extending outside of the casing for actuating the transmitting mechanism. It will be observed that the bridge instrument may comprise substantially two duplicate instruments 1, 2 each having its own transmitting handle for controlling the separate engine units in the engine room. The transmitting handle actuates a transmitter 15 through means such as a train of gearing 16, 17, 18. Since the range of the operation of the handle is in this case only 120°, the gearing between said handle and transmitter is 3 to 1, so that said transmitter makes a complete revolution. Said transmitter controls the movements of a motor 20 located within the engine room instrument 11 shown in Fig. 4. Said motor may be of the 20-step type and since, as shown, there are but 10 positions on the indicator, the said motor will actuate the pointer fixed to the shaft thereof through two steps for each position of the indicator. Loosely mounted on the shaft of the motor in Fig. 4 is a controller handle 22 adapted to be actuated by the engineer to cause a pointer 23 fixed thereto to coincide with the pointer 24 on the shaft of motor 20 indicating the order sent. The movements of the said engineer's handle is caused to actuate a transmitter 26 through gearing and said transmitter controls a motor 30 located within the bridge instrument, the shaft of said motor carrying a flange 27 having a graduated periphery with indications corresponding to the indications on the engineer's instrument, so that by looking through a window 31 in the bridge instrument the position of the engineer's handle is readily visible. A visible indication is thus obtained on the bridge of the responses made in the engine room to the orders sent.

However, we provide in addition for securing a permanent record not only the engineer's responses but of the orders sent to the engineer. For this purpose we provide a traveling chart 32, the movement of which is controlled by means such as a clock 33, sprockets engaging the holes in the sides of the chart being driven, so that a constant feed may be obtained. Indications are made upon said chart by means of a stylus 40 fixed to a carriage 41 which is supported for movement laterally on the chart upon rails 42 forming part of a frame 43. The said carriage is controlled by means of a link 44 fixed to one end of a bell crank 45, the other end of which is caused to move in accordance with both the movements of the bridge handle 13 and the movements of the engineer's handle 22. In order to accomplish this we mount the other end of said bell crank in a cam slot 46 (see Fig. 2) formed in a member 47 driven from the planetary member 48 of a differential mechanism, as by means of a gear 49 fixed to member 48 and meshing directly with cam member 47 or with a gear 47' fixed upon the same shaft therewith. One side of said differential mechanism is controlled by the bridge handle by mounting the gear 50 of the differential upon the shaft of transmitter 15, while the other side of said differential is controlled by the engineer's handle by mounting the other gear 51 of said differential on a shaft carrying one gear 52 of a train 52, 53, 54 operated from the engine-room-controlled motor 30. It will thus be apparent that actuation of the bridge handle or actuation of the engineer's handle will cause operation of said planetary member of the differential and hence of the cam to operate the stylus across the chart. The gearing and the direction of operation of the transmitters are such that similar actuation of the two handles will cause similar operation of the planetary member one half the distance toward the required sub-division on the chart, so that the movements of the engineer's handle are added to the movements of the bridge handle to bring the stylus into the required sub-division. By this construction it becomes apparent that movement of the bridge handle will actuate the stylus in one direction or the other from a base-line one half the distance toward the proper indication on the chart, and that operation of the engineer's handle in response to said order will move the stylus the remaining one half distance to the proper indication, as shown in Fig. 7.

In order to differentiate that portion of the record made by actuation of the bridge handle from that portion made by actuation of the engineer's handle, we may provide means for causing said first record to assume a sinuous or wavy form, while the second portion of the record is straight. To impart to the record of all bridge handle movements a sinuous form, we may mount upon the same shaft with said bridge handle a toothed wheel, or we may employ the gear 16 (see Fig. 7), over which is adapted to operate one end of a bell crank 61, the other end of which is in forked engagement with a second bell crank 62 in a plane at right angles to the first bell crank, said second bell crank having its other end in forked engagement with the frame 43 carrying the stylus carriage. Said frame is pivoted at 65 for movement on a horizontal axis about its lower end so that movement of the bridge handle will impart a vibratory movement to said frame to produce a sinuous line on the record chart.

Since the engineer's handle is never operated until the bridge signal has been fully transmitted, there can be no danger in the normal operation of the device that the sinuous and straight lines will be simultaneously recorded to give a composite of the two.

Various signals, such as a light 66, which may be mounted on the dome of the bridge instrument, and a dome light 69 in the engine room instrument may be employed, whenever the engine instrument is out of synchronism with the bridge instrument, that is to say, whenever the engine room has failed to respond to the transmitted signal. For this purpose any suitable circuit closer and follow-up mechanism may be employed, such as that shown in Figs. 3, 5 and 6, wherein a contact disc 70 may be provided on the same shaft with the stylus-operating cam member 47. A pair of fixed brushes 71, 72 may be provided in engagement with disc 70 so that the circuit controlling the signals passes from one brush through the contact disc to the other brush. Disc 70 is provided with an insulated strip 73 in the path of at least one of said brushes, so positioned that when the engineer's and bridge instruments are in synchronism, one of the brushes 71, 72 will engage strip 73 to break the circuit through the various signals. Operation of the bridge handle will move strip 73 out of engagement with the brushes to close the circuit through the signals. Operation of the engineer's handle in the proper direction will move strip 73 back into engagement with the brush to break the circuit.

In addition to recording the signals sent and responses made thereto by the engineer, we may, if we so desire, record upon the chart, simultaneously with the other record, indications of the actual performance of the engines, that it to say, whether said engines are running ahead, astern or are not operating. For this purpose we may provide three additional sub-divisions on the record chart which may be headed "Ahead," "Stop," "Astern," with which is adapted to co-act a stylus 85 forming part of an armature 86 pivotally mounted so that said stylus may swing to the right or left to yield, with its central or stop position, three positions thereof for co-acting with the said three sub-divisions of the record chart. For actuating said armature in accordance with the actual performance of the engines, we may utilize the following mechanism. Driven from the propeller shaft in any suitable manner, as by the gearing 87, 88 shown, is a drum 89 preferably provided with corrugations 90 (see Fig. 8) on its interior and filled with fluid so that when said drum is rotated by the rotating propeller shaft a certain amount of fluid pressure in the form of eddy currents will be set up in one direction or the other, depending upon the direction of operation of the propeller shaft. Said fluid currents are caused to act upon a vane 91 mounted for movement upon a vertical axis coinciding with the axis of the drum, to drag said vane along in the direction of the movement of said drum. The movement of said vane may be caused to actuate a contact-carrying plate or segment 92 (see Fig. 10) through suitable gearing so that movement of said vane in one direction or the other will close one set of spring contacts 93 or the other set 94 to selectively energize one of two electro-magnets 95, 96 cooperating with the stylus-carrying armature 86. As soon as the propeller shaft ceases rotating, the fluid pressure upon the vane is released and a very slight movement, such as that due to the contact springs, acting upon said segment as by engaging pins 97 thereon, will be sufficient to restore said vane to centralized position in which case neither electro-magnet is energized and the stylus will register with the "Stop" sub-division of the chart. The armature 86 is also provided with centralizing means such as centralizing springs 79.

In accordance with the provisions of the patent statutes, we have herein described the principle and operation of our invention, together with the apparatus which we now consider to represents the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a ship's telegraph and recorder device, a traveling chart, a recording stylus co-acting with said chart, a bridge transmitter for sending orders, an engine room transmitter for transmitting responses to said orders, means whereby both of said transmitters actuate said stylus, and means for differentiating the records made by said stylus due to actuation by one of said transmitters from those due to actuation by the other of said transmitter.

2. In a ship's telegraph and recorder device, a traveling chart, a recording stylus co-acting with said chart, a bridge transmitter for sending orders, an engine room transmitter for transmitting responses to said orders, means whereby both of said transmitters actuate said stylus, and means whereby one of said transmitters actuate said stylus to produce a vibratory or sinuous line of record and the other of said transmitters actuates said stylus to produce a straight line record.

3. In a ship's telegraph and recorder mechanism, a bridge transmitter for sending orders, an engine room transmitter for transmittting responses to said orders, a single indicator actuated in accordance with the movements of said transmitters, and means actuated by one of said transmitters for vibrating said indicator during actuation thereof.

4. In a ship's telegraph and recorder device, a traveling chart, a recording stylus co-acting with said chart, a bridge transmitter for sending orders, an engine room transmitter for transmitting responses to said orders, and means whereby both of said transmitters actuate said stylus in similar direction for similar indicating movements of said transmitters.

5. In a ship's telegraph and recorder device, a traveling chart, a recording stylus co-acting with said chart, a bridge transmitter for sending orders, an engine room transmitter for transmitting responses to said orders, and means including a differential whereby both of said transmitters actuate said stylus.

6. In a ship's telegraph and recorder mechanism, a bridge transmitter for sending orders, an engine room transmitter for transmitting responses to said orders, a differential, means whereby said transmitters actuate said differential in similar directions for similar indicating movements of said transmitters, and an indicator controlled by said differential.

7. In a ship's telegraph and recorder mechanism, a travelling chart having order divisions, a recording stylus coacting with said chart, a bridge transmitter for sending orders to the engine room, an engine room transmitter for transmitting responses to said orders to the bridge, means whereby said first-named transmitter actuates said stylus partway to the division on the chart showing the order transmitted, and means whereby said second named transmitter actuates said stylus the balance of the distance to bring said stylus on the correct order position.

In testimony whereof we have affixed our signatures.

LESLIE F. CARTER.
FREDERICK S. HODGMAN.